(12) United States Patent
Brock et al.

(10) Patent No.: US 6,846,136 B2
(45) Date of Patent: Jan. 25, 2005

(54) ROTATABLE CUTTING TOOL

(75) Inventors: James R. Brock, Rochester Hills, MI (US); James J. Robinson, Rochester Hills, MI (US)

(73) Assignee: Velenite Inc., Madison Heights, MI (US)

(*) Notice: Subject to any disclaimer, the term of this patent is extended or adjusted under 35 U.S.C. 154(b) by 151 days.

(21) Appl. No.: 10/212,277

(22) Filed: Aug. 6, 2002

(65) Prior Publication Data

US 2004/0028489 A1 Feb. 12, 2004

(51) Int. Cl.[7] .................................................. B23B 29/034
(52) U.S. Cl. ........................ 408/154; 408/156; 408/158
(58) Field of Search ................................. 408/153, 154, 408/155, 156, 158, 159, 180

(56) References Cited

U.S. PATENT DOCUMENTS

| 1,805,802 | A |   | 5/1931 | Browne |          |
|-----------|---|---|--------|--------|----------|
| 3,530,745 | A | * | 9/1970 | Milewski | ............ 408/158 |
| 3,740,161 | A | * | 6/1973 | Milewski | ............ 408/158 |
| 4,224,846 | A |   | 9/1980 | Sawada et al. |    |
| 4,858,439 | A |   | 8/1989 | Sawada et al. |    |
| 4,941,782 | A |   | 7/1990 | Cook |            |
| 6,243,962 | B1 |  | 6/2001 | Brock |           |
| 6,394,710 | B1 | * | 5/2002 | Kurz | .................. 408/1 R |

FOREIGN PATENT DOCUMENTS

| EP | 1 123 766 A1 |   | 8/2001 |            |
|----|--------------|---|--------|------------|
| JP | 1-101708     |   | 7/1989 |            |
| JP | 2002-307216  | * | 10/2002 | ............ 408/158 |

* cited by examiner

*Primary Examiner*—Daniel W. Howell
(74) *Attorney, Agent, or Firm*—Burns, Doane, Swecker & Mathis, LLP

(57) ABSTRACT

A rotatable cutting tool has a shank portion for coupling to a tool driving device and a cutting portion to which is attached at least one support member for retention of a replaceable cutting element. The support member is so arranged to permit displacement of at least the portion thereof retaining the cutting element whereby the position of the cutting element relative to the body of the cutting tool may be changed by such displacement. A totally enclosed hydraulic force multiplier is mounted within an internal cavity of the cutting tool. The force multiplier is responsive to a control force to effect the displacement of the support member, the control force advantageously supplied by application of pneumatic pressure.

18 Claims, 2 Drawing Sheets

ROTATABLE CUTTING TOOL

BACKGROUND OF THE INVENTION

I. Field of the Invention

This invention relates to cutting tools and particularly to rotatable cutting tools of the type having at least one cutting element the position of which relative to the tool is adjustable by remotely controllable adjusting devices. More particularly, this invention relates to improved actuators for remotely controlled adjusting of relative position of cutting elements of rotatable cutting tools.

II. Description of Related Art

Known rotatable tools comprising position adjustable cutting elements use various means for effecting changes of position of the cutting elements. Examples of such rotatable tools using mechanical actuating devices are illustrated in EP Patent Application No. 1123766. An example of a rotatable tool using hydraulic actuating devices requiring supply of hydraulic fluid is illustrated in Japanese Utility Model Application No. 62-201231. Tools of this type have the inherent disadvantage of requiring couplings for supply of hydraulic fluid through the tool driving device. U.S. Pat. No. 4,941,782 illustrates tools of the type wherein pneumatic pressure is supplied to a rotatable tool from an external source to control operation of a hydraulically operated device within the tool body. Such known tools have the disadvantage of requiring sliding seals between internal pistons and cavities containing hydraulic fluids. Such seals, if not routinely replaced and reconditioned are a common source of leakage of hydraulic fluid, impairing operation of the adjusting devices. In light of known rotatable tools providing remotely controllable hydraulically operated adjusting devices for adjusting the position of cutting elements, there is a need for improved actuators for such tools to overcome the disadvantages associated with the known hydraulic devices.

SUMMARY OF THE INVENTION

It is an object of the present invention to provide a rotatable cutting tool having mounted within an internal cavity a totally enclosed hydraulic force multiplier responsive to a control force for effecting adjustment of position of a cutting element mounted to the tool.

It is a further object of the present invention to provide a rotatable cutting tool having a cutting element mounted to a support member, a totally enclosed hydraulic force multiplier mounted within an internal cavity of the tool and responsive to a control force, a push rod responsive to force applied by the force multiplier to move along a first vector, and a drive member interposed between the push rod and the support member for converting motion along the first vector to motion along a second vector intersecting the first vector.

Further objects and advantages of the invention shall be made apparent from the accompanying drawings and the following description thereof.

In accordance with the aforesaid objects the present invention provides a rotatable cutting tool having a shank portion for mounting to a tool driving device and a cutting portion to which is attached at least one support member for retention of a replaceable cutting element. The support member is so arranged to permit displacement of at least the portion thereof retaining the cutting element whereby the position of the cutting element relative to the body of the cutting tool may be changed by such displacement. A totally enclosed hydraulic force multiplier is mounted within an internal cavity of the cutting tool. The force multiplier is responsive to a control force to effect the displacement of the support member, the control force advantageously supplied by application of pneumatic pressure.

DETAILED DESCRIPTION OF THE PREFERRED EMBODIMENT

The invention shall be described with reference to a preferred embodiment illustrated in the accompanying figures. While the preferred embodiment illustrates features of the invention, it is not the intention of applicants that the invention be limited to particular details of the preferred embodiment.

Figure 1:
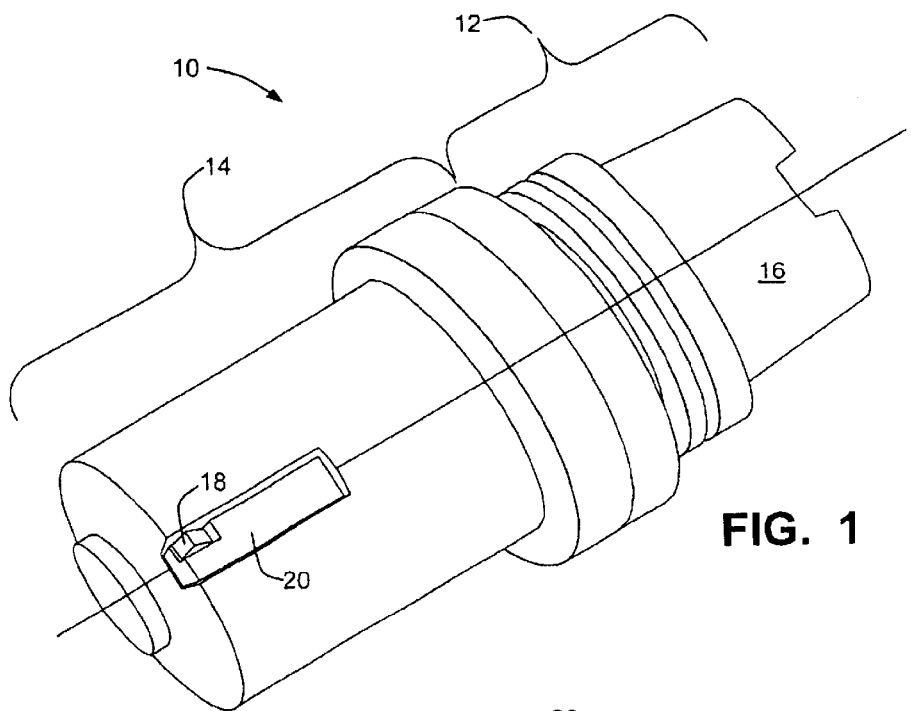
FIG. 1 is a three dimensional view of a cutting tool having a repositionable cutting element cartridge.

A rotatable cutting tool 10 depicted in FIG. 1 includes a shank portion 12 and a cutting portion 14. Shank portion 12 is suitable for mounting to an adapter 16 for connection to a tool driving apparatus such as the rotatable spindle of a machine. Adapter 16 may be suitable for tool driving spindles of machines lacking automatic tool changing mechanisms. Further, adapter 16 advantageously conforms to standards to assure compatibility with standardized automatic tool changing equipment, such as well known standards for such adapters: HSK; DIN ISO/DIS 12164-1 & -2; ANSI 7/24 tapers; and, Japan's BT 7/24 tapers. Cutting portion 14 is generally cylindrical and comprises a cutter body 22 to which cutting elements are mounted. As illustrated in FIG. 1, a cutting element 18 is mounted to a support member 20 which is attached to cutter body 22.

Continuing with reference to FIG. 1, cutting element 18 is advantageously a replaceable body seated upon a recess of a support member, such as cartridge 20 (FIG. 2) and retained thereupon by screws, clamps, shims and the like to achieve a desired orientation of the cutting element with sufficient rigidity to resist dislocation of the cutting element by cutting forces. Cutting element 18 may comprise one or more cutting edges and is retained on cartridge 20 to expose at least one cutting edge for contact with a workpiece while tool 10 is rotated. The cutting edge so arranged is referred to as the "active cutting edge". Adjustment of the position of cutting element 18 relative to tool 10 is achieved by adjustment of the position of, at least, the portion of cartridge 20 to which cutting element 18 is affixed by a drive member within tool 10.

Cutting element 18 advantageously comprises a replaceable insert made of hard materials, such as high-speed steel, cemented tungsten carbide, ceramic materials, and the like, as are well known. The replaceable insert is advantageously made to include particular geometric features to enhance cutting performance in particular applications, including relief surfaces, chipbreaking features, chip controlling grooves and the like, all as are well known. Further, the replaceable insert may be formed to effect particular orientations of the cutting edges relative to the cutting tool axis of rotation as the inserts are mounted to the tool body, as is well known. Replaceable inserts usable in the present invention may be of a wide variety of shapes and sizes chosen for the particular type of machining to be performed all as are well known.

Figure 2:
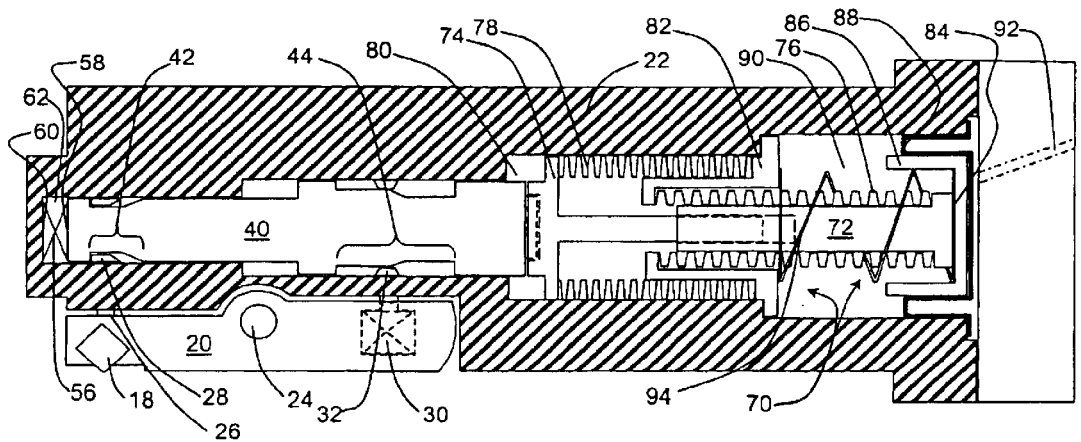
FIG. 2 is a partial sectional view of the cutting portion of the cutting tool of FIG. 1

Referring to FIG. 2, cartridge 20 is pivotally mounted to cutter body 22 by pivot pin 24. Cartridge 20 is pivoted on pin 24 by radial displacement of a drive member such as follower 26 (see FIG. 3). Advantageously, to effect radial displacement of the drive member, and hence changes of radial position of cutting element 18, without transverse mounting of an actuator, a push rod 40 is interposed between follower 26 and an actuator. Head 28 of follower 26 engages driving region 42 of push rod 40, reciprocation of push rod 40 parallel to the longitudinal axis of tool 10 being converted to radial motion of follower 26. Hence, push rod 40 and follower 26 are effective to convert motion of an actuator along a first vector to motion of the driving member along a second vector intersecting the first vector. A restoring force opposing displacement of follower 26 is provided by biasing member 30 (shown dashed in FIG. 2). Advantageously, biasing member 30 acts on follower 32 engaging restoring region 44 of push rod 40, whereby the restoring force can be varied within the span of displacement of follower 26. Hence, where biasing member 30 comprises a spring or other resilient member wherein the restoring force is a function of the effective length of the resilient member, the restoring force may be kept substantially constant throughout the travel of follower 26.

Figure 3:
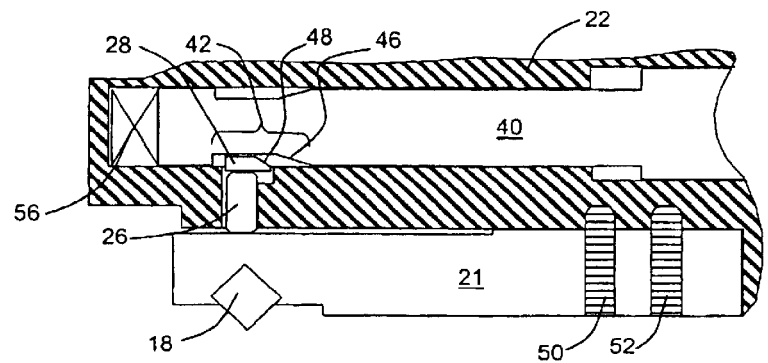
FIG. 3 is an enlarged view of a portion of a cutting tool showing an alternative cutting element cartridge.

Referring to FIG. 3, an alternative arrangement for cutting element cartridge 21 is illustrated in an enlarged partial section. Cutting element cartridge 21 is attached to cutter body 22 by a fixed mounting using mounting screws 50 and 52 so as to leave a portion of cutting element cartridge 21 free from cutter body 22. Follower 32 engages the free portion of cutting element cartridge 21. Displacement of follower 32 away from push rod 40 elastically deforms cutting element cartridge 21 to radially adjust the position of cutting element 18 relative to cutter body 22. The elastic deformation of cutting element cartridge 21 provides a restoring force without use of an additional member such as biasing member 30 illustrated in FIG. 2.

Figure 4A:
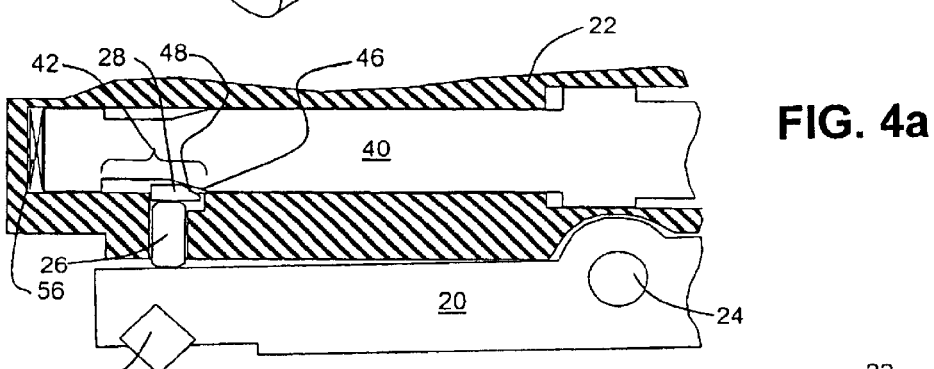
FIG. 4a is an enlarged view of a portion of a cutting tool of FIG. 2 showing the push rod advanced.
Figure 4B:
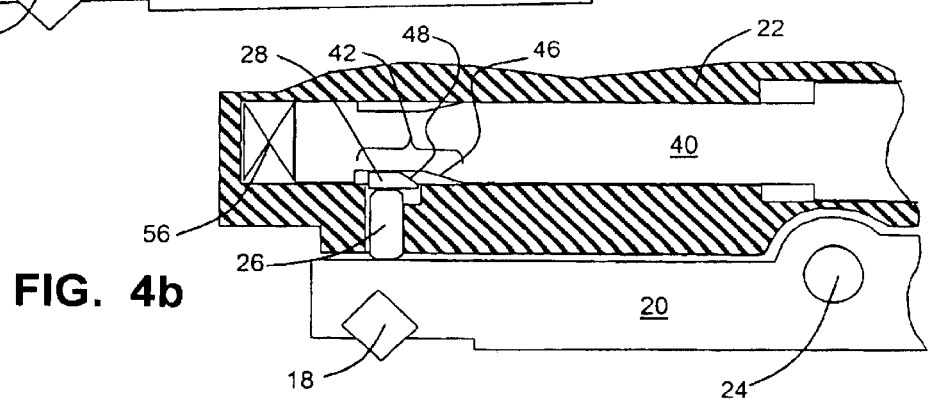
FIG. 4b is an enlarged view of a portion of the cutting tool of FIG. 2 showing the push rod retracted.

Irrespective of whether the cutting element cartridge is pivotally mounted to cutter body 22 as shown in FIG. 2 or attached by a fixed mounting as shown in FIG. 3, reciprocation of push rod 40 within cutter body 22 displaces driving region 42 relative to follower 26. As shown in the enlarged partial sectional view of FIG. 4a, with push rod 40 advanced, oblique surface 46 (FIG. 4b) of driving region 42 engages oblique surface 48 of head 28 to displace follower 26 away from push rod 40. As shown in the enlarged partial sectional view of FIG. 4b, with push rod 40 retracted, oblique surface 46 of driving region 42 is disengaged from oblique surface 48 (FIG. 4a) of head 28 allowing the restoring force of biasing member 30 to displace follower 28 toward push rod 40. The radial displacement of follower 26 effects rotation of cartridge 20 about pivot pin 24 altering the position of cutting element 18 relative to cutter body 22.

Continuing with reference to FIG. 2, reciprocation of push rod 40 is effected by hydraulic force multiplier 70 within cutter body 22 and restoring spring 56 fitted between end face 58 of push rod 40 and seat 60 of cavity 62 in cutter body 22. Force multiplier 70 responds to application of a control force, advantageously provided by a variable pneumatic pressure, to produce sufficient force to overcome the restoring force of spring 56 to advance push rod 40 to compress spring 56. Push rod 40 and force multiplier 70 may be advantageously mechanically connected by attachment of push rod 40 to piston 74 of force multiplier 70. In FIG. 2 an interfitting connection is shown in dashed lines at the interface of push rod 40 and piston 74, the dashed lines representative of, for example, a threaded connection whereby stand off of push rod 40 from piston 74 is adjustable. Not shown in FIG. 2, there will be provided conventional facilities for locking the connection of push rod 40 and piston 74 once the desired stand off has been established. With a mechanical connection of push rod 40 and piston 74, as an alternative arrangement to single spring 56 acting on push rod 40, one or more springs may be arranged to act directly on piston 74.

Force multiplier 70 comprises small piston 72 and large piston 74. Large piston 74 is slidably supported within cavity 80 in the interior of cutter body 22. Force multiplier 70 further comprises small bellows 76 surrounding small piston 72 and large bellows 78 surrounding the volume within which small piston 72 is displaceable. Small bellows 76 and large bellows 78 are advantageously formed of material permitting repeated compaction and expansion along their respective longitudinal axes without perforation from deformation of the bellows folds. Applicants have chosen metallic bellows for both small bellows 76 and large bellows 78. A rearward extension of mounting flange 82 closely surrounds a portion of small bellows 76, large bellows 78 surrounds the rearward extension of mounting flange 82 surrounding small bellows 76, and mounting flange 82 is rigidly fixed to the interior of cutter body 22. It will be seen that adjustment of stand off of push rod 40 from large piston 74 permits compensation for manufacturing tolerances of the distance from the fixing surface of mounting flange 82 to large piston 74 with large bellows 78 relaxed, i.e. neither expanded nor compacted. The portion of mounting flange 82 surrounding small bellows 76 serves to maintain alignment of small bellows 76 along the longitudinal axis of cavity 80 as small bellows 76 is compacted and expanded. A forward extension of large piston 74 is slidably received within a bore (shown dashed in FIG. 2) of small piston 72, this sliding engagement maintaining alignment of small piston 72 and large piston 74. A front end of small bellows 76 is fixed to the rear of small piston 72 to form a seal therewith and a rear end of small bellows 76 is fixed to the front face of the rear end of flange 82 to form a seal therewith. A front end of large bellows 78 is fixed to the rear of the front end of flange 82 to form a seal therewith and a rear end of large bellows 78 is fixed to the front face of large piston 74 to form a seal therewith.

By virtue of the sealed attachments of the front and rear ends of large bellows 78 and small bellows 76 as described, a volume is contained within the space surrounded by large bellows 78 and small bellows 76 whereby hydraulic force multiplier 70 constitutes a totally enclosed force multiplier. The totally enclosed volume is filled with an essentially incompressible fluid. As small piston 72 is moved in the direction of large piston 74, collapsing small bellows 76, the fluid displaced applies a force on the front face of large piston 74. With sufficient force thereby applied to large piston 74 to overcome the restoring force of spring 56, large piston 74 moves away from small piston 72, expanding large bellows 78. By virtue of the ratio of effective areas of large piston 74 and small piston 72, a relatively small force acting on small piston 72 is multiplied to a relatively large force acting on push rod 40. Further, by virtue of the ratio of the relatively small diameter of small bellows 76 and the relatively large diameter of large bellows 78, a relatively large translation of small piston 72 is converted to a relatively small translation of large piston 74. Hence, precise changes of location of cutting element 18 relative to tool 10, precisely changing the effective machining dimension of tool 10, may be made within the range of adjustment permitted by the range of travel of large piston 74. The use of surrounding bellows in force multiplier 70 overcomes the chronic leaking of known hydraulic force multipliers operating with pistons sealed within fixed volume cavities by sliding seals.

Continuing with reference to FIG. 2, front face 84 of small piston 72 abuts cuphead 86. Cuphead 86 abuts rolling diaphragm 88 fixed at its periphery to cutter body 22 so as to form a seal therewith creating a sealed volume of cavity 90. A controlling force is applied to rolling diaphragm 88 by pneumatic pressure via channel 92 through cutter body 22. Rolling diaphragm 88 deforms in response to pressure differences between pressure in the sealed volume of cavity 90 and the pressure applied through channel 92. Rolling diaphragm 88 deforms so as to change the offset of the relatively large projecting central portion from the relatively narrower annular recessed portion while simultaneously changing the distance of the annular recessed portion from the surface to which the periphery of diaphragm 88 is affixed. Small piston 72 is moved in response to the force applied by deformation of rolling diaphragm 88 and the restoring force of spring 56 transferred through force multiplier 70. A restoring spring 94 is interposed between the interior of cuphead 86 and the front face of the front end of mounting flange 82 and surrounding the portion of small bellows 76 projecting forwardly beyond mounting flange 82. Restoring spring 94 provides a restoring force to return rolling diaphragm 88 to its equilibrium shape. Hence, by controlling the pneumatic pressure applied through channel 92, deformation of rolling diaphragm 88 can be controlled, and location of small piston 72 within its range of motion can be controlled. Since relatively large changes of location of small piston 72 effect relatively small changes of location of large piston 74, precise adjustment of the location of cutting element 18 relative to tool 10 can be achieved with regulation of the applied pneumatic pressure. Hence, precise adjustment of effective machining dimensions of tool 10 can be achieved throughout the range of displacement of cutting element 18 by controlling the applied pneumatic pressure.

While the invention has been described with reference to a preferred embodiment, and the preferred embodiment has been described in considerable detail, it is not the intention of the applicants that the invention be defined by the preferred embodiment. Rather, it is the intention of the applicants that the invention be defined by the appended claims and all equivalents thereto.

What is claimed is:

1. A rotatable cutting tool having a shank portion and a cutting portion, the cutting portion comprising a cutter body on which is mounted a support member for supporting a cutting element, a drive member movable within the cutter body and engaging the support member, a totally enclosed hydraulic force multiplier mounted within a cavity of the cutter body for effecting movement of the drive member, the force multiplier being responsive to an applied control force for changing the position of the cutting element relative to the cutter body.

2. The rotatable cutting tool of claim 1 further comprising a push rod interposed between the drive member and the force multiplier, the push rod effective to convert motion of the push rod along a first vector to motion of the drive member along a second vector intersecting the first vector.

3. The rotatable cutting tool of claim 2 wherein the push rod is mechanically connected to the force multiplier so as to permit adjustment of stand off of the push rod from the force multiplier.

4. The rotatable cutting tool of claim 1 wherein the support member is pivotally mounted to the cutter body and the driving member pivots the support member to change the position of the cutting element relative to the cutter body and the cutting tool further comprises a biasing member acting on the support member to oppose displacement of the drive member.

5. The rotatable cutting tool of claim 1 wherein the support member is fixedly attached to the cutter body so as to leave a portion of the support member free, the cutting element is mounted to the free portion of the support member, and the driving member elastically distorts the support member to change the position of the cutting element relative to the cutter body.

6. The rotatable cutting tool of claim 1 wherein the applied control force is supplied by pneumatic pressure.

7. The rotatable cutting tool of claim 5 further comprising a rolling diaphragm sealing the cavity whereby differences between the applied pneumatic pressure and the internal pressure of the cavity cause the rolling diaphragm to deform, and the totally enclosed hydraulic force multiplier responds to force applied by the rolling diaphragm.

8. The rotatable cutting tool of claim 1 wherein the totally enclosed hydraulic force multiplier further comprises a small piston, a small bellows attached at the front end thereof to the small piston, a large piston, a large bellows attached at the rear end thereof to the large piston, a mounting flange for mounting the force multiplier to the cutter body, the front end of the large bellows being attached to the mounting flange and the rear end of the small bellows being attached to the mounting flange, the attachments of the front and rear ends of the large and small bellows forming seals, and the sealed volume created thereby being filled with an essentially incompressible fluid.

9. The rotatable cutting tool of claim 8 further comprising a push rod interposed between the drive member and the force multiplier, the push rod effective to convert motion of the push rod along a first vector to motion of the drive member along a second vector intersecting the first vector.

10. The rotatable cutting tool of claim 9 further comprising at least one restoring spring for resisting the force exerted by the totally enclosed hydraulic force multiplier.

11. The rotatable cutting tool of claim 10 wherein the restoring spring is interposed between the push rod and the cutter body.

12. The rotatable cutting tool of claim 10 wherein the restoring spring is interposed between the large piston and the cutter body.

13. The rotatable cutting tool of claim 9 wherein the push rod is mechanically connected to the large piston so as to permit adjustment of the stand off of the push rod from the large piston.

14. The rotatable cutting tool of claim 8 wherein a rearward extension of the mounting flange closely surrounds a portion of the small bellows and the large bellows surrounds the rearward extension of the mounting flange surrounding the small bellows.

15. The rotatable cutting tool of claim 8 wherein the large piston further comprises a forward extension and the small piston further comprises a bore for slidably receiving the forward extension of the large piston, whereby the large piston and small piston are maintained in alignment.

16. The rotatable cutting tool of claim 8 wherein the applied control force is supplied by pneumatic pressure.

17. The rotatable cutting tool of claim 16 further comprising a rolling diaphragm sealing the cavity whereby differences between the applied pneumatic pressure and the internal pressure of the cavity cause the rolling diaphragm to deform, and the totally enclosed hydraulic force multiplier responds to force applied by the rolling diaphragm.

18. The rotatable cutting tool of claim 17 further comprising a cuphead within the cavity and abutting the rolling diaphragm and a restoring spring interposed between the cuphead and the mounting flange and surrounding the portion of the small bellows projecting forwardly beyond the mounting flange.

* * * * *